(12) United States Patent
Grothaus et al.

(10) Patent No.: US 9,699,818 B2
(45) Date of Patent: *Jul. 4, 2017

(54) PAIRING OF A BATTERY MONITOR TO A COMMUNICATION DEVICE

(71) Applicant: Crown Equipment Corporation, New Bremen, OH (US)

(72) Inventors: Brent J. Grothaus, Delphos, OH (US); Dean Winner, Celina, OH (US)

(73) Assignee: Crown Equipment Corporation, New Bremen, OH (US)

( * ) Notice: Subject to any disclaimer, the term of this patent is extended or adjusted under 35 U.S.C. 154(b) by 136 days.

This patent is subject to a terminal disclaimer.

(21) Appl. No.: 14/666,650

(22) Filed: Mar. 24, 2015

(65) Prior Publication Data

US 2015/0195861 A1 Jul. 9, 2015

Related U.S. Application Data

(63) Continuation of application No. 13/832,681, filed on Mar. 15, 2013, now Pat. No. 9,013,323.

(51) Int. Cl.
*G08C 17/02* (2006.01)
*B60L 11/18* (2006.01)
(Continued)

(52) U.S. Cl.
CPC ....... *H04W 76/023* (2013.01); *B60L 11/1838* (2013.01); *B60L 11/1848* (2013.01);
(Continued)

(58) Field of Classification Search
CPC .............. B60L 11/1838; B60L 11/1848; B60L 11/1861; G08C 17/02; H01M 10/06;
(Continued)

(56) References Cited

U.S. PATENT DOCUMENTS 5,465,207 A 11/1995 Boatwright et al.
6,556,020 B1 4/2003 McCabe et al.
(Continued)

FOREIGN PATENT DOCUMENTS

CN 1137181 A 12/1996
DE 102008019810 A1 10/2009
(Continued)

OTHER PUBLICATIONS

AeroVironment, Inc., Battery Rx™, Your Solution for Battery Health, PosiCharge™, 2011.
(Continued)

*Primary Examiner* — Yong Hang Jiang
(74) *Attorney, Agent, or Firm* — Stevens & Showalter, LLP

(57) ABSTRACT

A monitoring system comprises a storage device monitor and a communication device. The storage device monitor is powered by an energy storage device (e.g., battery or fuel cell) to which the storage device monitor is attached. The communication device is mounted on an industrial vehicle or battery charger. A load is electrically connected to the communication device that is external to and independent from the storage device monitor. In operation, the communication device transmits an encoded message to the load. A controller of the storage device monitor detects the encoded message by sensing changes in a characteristic of the energy storage device that occur responsive to the communication device transmitting the encoded message to the load. The controller of the storage device monitor converts the encoded message into a discovery parameter, and pairs with the communication device across a wireless network based upon the discovery parameter.

20 Claims, 7 Drawing Sheets

(51) Int. Cl.
*H04W 76/02* (2009.01)
*H01M 10/48* (2006.01)
*H04Q 9/00* (2006.01)
*H04L 29/08* (2006.01)
*H04W 4/00* (2009.01)
*H04W 12/04* (2009.01)
*H01M 10/06* (2006.01)

(52) U.S. Cl.
CPC .......... *B60L 11/1861* (2013.01); *G08C 17/02* (2013.01); *H01M 10/488* (2013.01); *H04L 67/12* (2013.01); *H04Q 9/00* (2013.01); *H04W 4/005* (2013.01); *H04W 12/04* (2013.01); *H01M 10/06* (2013.01); *H04Q 2209/40* (2013.01); *Y02E 60/126* (2013.01); *Y02T 10/7005* (2013.01); *Y02T 10/705* (2013.01); *Y02T 10/7016* (2013.01); *Y02T 10/7044* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC . H01M 10/488; H04L 67/12; H04Q 2209/40; H04Q 9/00; H04W 12/04; H04W 4/005; H04W 76/023; Y02T 10/7005; Y02T 10/7016
USPC ..... 340/855.8, 531, 539.26, 693.1, 7.2, 333, 340/3.1, 3.7; 455/572, 573, 574, 41.2, 455/41.3
See application file for complete search history.

(56) References Cited

U.S. PATENT DOCUMENTS

| | | | |
|---|---|---|---|
| 6,653,817 B2 | 11/2003 | Tate, Jr. et al. | |
| 7,072,871 B1 | 7/2006 | Tinnemeyer | |
| 7,155,264 B2 * | 12/2006 | Twitchell, Jr. | H04L 69/329 455/343.2 |
| 7,242,970 B2 * | 7/2007 | Hong | H04M 1/6091 379/420.01 |
| 7,363,129 B1 | 4/2008 | Barnicle et al. | |
| 7,373,264 B2 | 5/2008 | Verbrugge et al. | |
| 7,598,743 B2 | 10/2009 | Bertness | |
| 7,707,054 B2 | 4/2010 | Ehrman et al. | |
| 8,025,474 B2 | 9/2011 | Springston et al. | |
| 8,059,573 B2 | 11/2011 | Julian et al. | |
| 8,060,400 B2 | 11/2011 | Wellman | |
| 8,072,309 B2 | 12/2011 | Kraimer et al. | |
| 8,193,903 B2 | 6/2012 | Kraimer et al. | |
| 2006/0043933 A1 | 3/2006 | Latinis | |
| 2007/0096765 A1 | 5/2007 | Kagan | |
| 2009/0034591 A1 | 2/2009 | Julian et al. | |
| 2010/0121588 A1 | 5/2010 | Elder et al. | |
| 2010/0228425 A1 | 9/2010 | Tanaka | |
| 2011/0106280 A1 | 5/2011 | Zeier | |
| 2011/0258838 A1 | 10/2011 | McCabe et al. | |
| 2011/0260735 A1 | 10/2011 | McCabe et al. | |
| 2011/0264316 A1 | 10/2011 | McCabe et al. | |
| 2012/0035870 A1 | 2/2012 | Bertness | |
| 2012/0038473 A1 | 2/2012 | Fecher | |
| 2012/0254987 A1 | 10/2012 | Ge et al. | |
| 2012/0316814 A1 | 12/2012 | Rahaman et al. | |
| 2013/0038272 A1 | 2/2013 | Sagata | |

FOREIGN PATENT DOCUMENTS

| | | |
|---|---|---|
| EP | 2110922 A2 | 10/2009 |
| WO | 2010132775 A1 | 11/2010 |

OTHER PUBLICATIONS

Aker Wade Power Technologies LLC, SBO Single Battery Operation, DC Power Logger, 2011.
EnerSys, Drive up your productivity!, Wireless Battery Monitoring Devices, Wi-IQ® / Wi-IQ® 2, 2012.
Miller, Mike, "The Secret Life of Batteries", ivTInternational.com, Nov. 2012.
AeroVironment, Inc., AV™ aerovironment, "PosiCharge PosiNet Back-Office", Apr. 2012.
McCabe, Paul and LaFergola, Joe, The Raymond Corporation, iBattery White Paper, "Protecting the Power Source", Oct. 31, 2011.
Hans, Bagge AF Berga; Intgernational Search Report and Written Opinion of the International Searching Authority; Application No. PCT/US2014/026986; Nov. 17, 2014; European Patent Office, Rijswijk, The Netherlands.
Bécamel, Philippe; International Preliminary Report on Patentability; International Application No. PCT/US2014/026986; Sep. 15, 2015; The International Bureau of WIPO; Geneva, Switzerland.

* cited by examiner

PAIRING OF A BATTERY MONITOR TO A COMMUNICATION DEVICE

CROSS REFERENCE TO RELATED APPLICATIONS

This application is a continuation of U.S. patent application Ser. No. 13/832,681, entitled PAIRING OF A BATTERY MONITOR TO A COMMUNICATION DEVICE, filed Mar. 15, 2013, now allowed, the disclosure of which is hereby incorporated by reference.

BACKGROUND

The present disclosure relates in general to wirelessly linking two communications devices.

Industrial batteries represent a significant operating cost for operators of fleets of industrial vehicles. In this regard, operating cost is realized in both servicing the battery (e.g., recharging the battery, performing maintenance on the battery, etc.) and in replacement of a worn out battery.

Lead-acid batteries represent a predominant type of industrial battery, especially for electrically operated vehicles such as forklift trucks. However, despite over one hundred years of proven reliability in use and relatively low acquisition cost per kilowatt hour, lead-acid batteries, like all batteries still require service and eventual replacement.

BRIEF SUMMARY

According to aspects of the present disclosure, a monitoring system for industrial vehicles, comprises a storage device monitor and a communication device. More particularly, the storage device monitor is powered by an energy storage device to which the storage device monitor is attached. The storage device monitor comprises a wireless transceiver, a sensor capable of sensing an energy storage device characteristic, and a controller coupled to the wireless transceiver and the sensor. The communication device is mounted to an industrial vehicle, where the communication device and the industrial vehicle are also powered by the energy storage device. The communication device comprises a wireless transceiver. Also, a load is electrically connected to the communication device, where the load is external to, and independent from, the storage device monitor. In operation, the communication device is programmed to transmit an encoded message to the load. Moreover, the controller of the storage device monitor is programmed to detect, using the sensor, the encoded message by sensing changes in the energy storage device characteristic that occur responsive to the communication device transmitting the encoded message to the load. The controller of the storage device monitor is further programmed to convert the encoded message into a discovery parameter, and pair with the communication device across a wireless network based upon the discovery parameter. Thereafter, the communication device and the storage device monitor wirelessly communicate information between each other using the paired wireless connection.

According to further aspects of the present disclosure, a monitoring system comprises a storage device monitor and a communication device. The storage device monitor is powered by an energy storage device to which the storage device monitor is attached. Moreover, the storage device monitor comprises a wireless transceiver, a sensor capable of sensing an energy storage device characteristic, and a controller coupled to the wireless transceiver and the sensor. The communication device is mounted on a battery charger. Moreover, the communication device comprises a wireless transceiver. Also, a load is electrically connected to the communication device. Here, the load is external to and independent from the storage device monitor. In operation, the communication device is programmed to transmit an encoded message to the load. The controller of the storage device monitor is programmed to detect, using the sensor, the encoded message by sensing changes in the energy storage device characteristic that occur responsive to the communication device transmitting the encoded message to the load. The controller of the storage device monitor is further programmed to convert the encoded message into a discovery parameter, and pair with the communication device across a wireless network based upon the discovery parameter.

DETAILED DESCRIPTION

Figure 1:
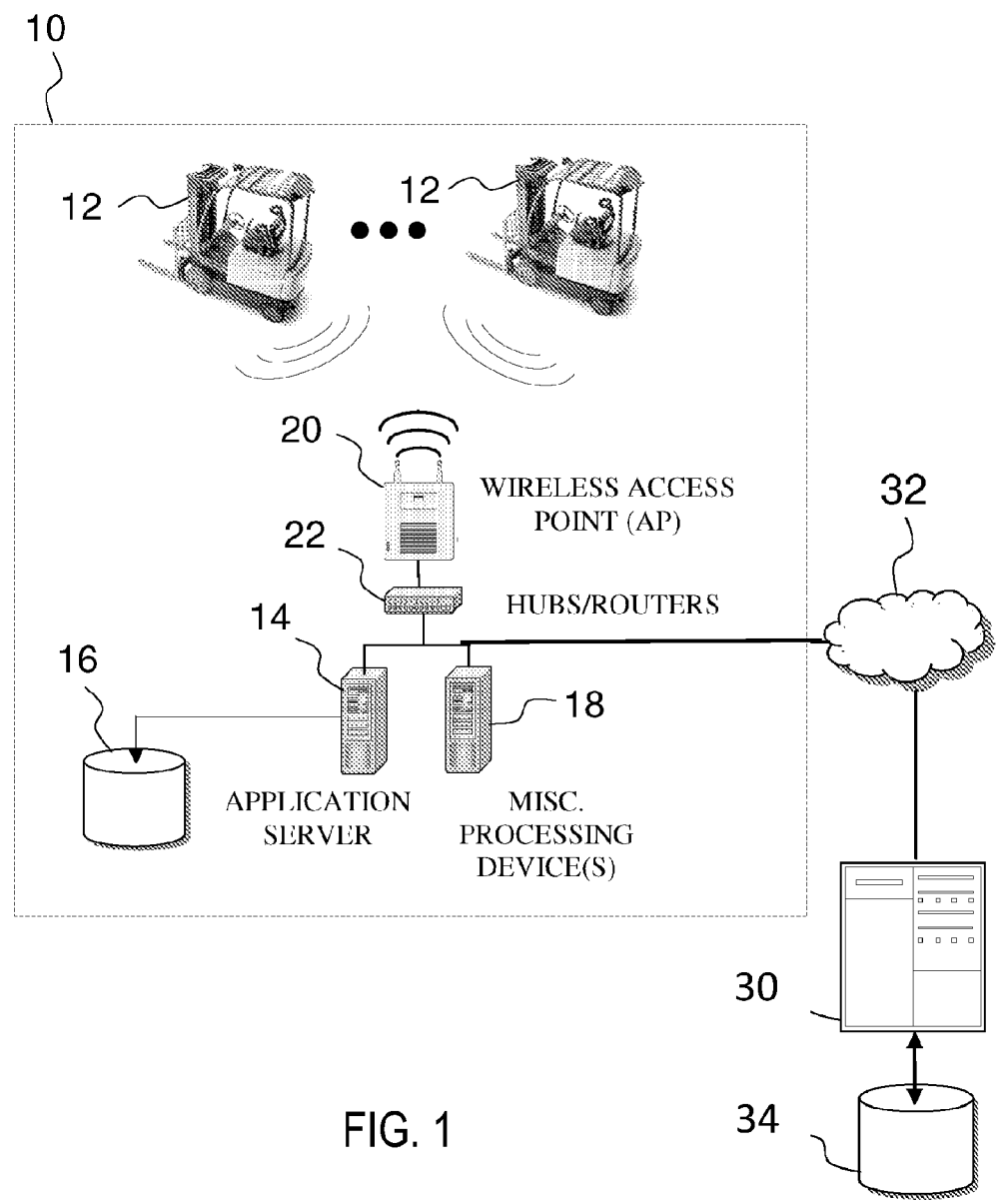
FIG. 1 is a schematic of an illustrative operating environment in which aspects of the disclosure herein may be practiced.

According to various aspects of the present disclosure, approaches are provided for uniquely pairing a battery monitor to a communication device for wireless communication therebetween. This allows, for instance, battery usage information to be wirelessly communicated from the battery monitor to the communication device. Moreover, the pairing may allow the communication device to communicate information to the battery monitor. More particularly, a battery monitor is provided on an industrial vehicle battery for monitoring battery use. As such, when the battery is installed in an industrial vehicle, the battery monitor is mobile with the industrial vehicle. The industrial vehicle may also have a communication device that allows communication between a remote server computer and the industrial vehicle. As such, the communication device is also mobile with the same industrial vehicle as the battery monitor.

Connecting the battery monitor to the communication device with direct wire connections may not be practical or desirable. For instance, it may be possible to damage the wire(s) connecting the battery monitor to the communication device during the installation and the removal of the battery, during use of the industrial vehicle, or through other activities. Moreover, a user installing a battery in the industrial vehicle may forget to make the connection between the battery monitor and the communication device. Accordingly, aspects of the present disclosure herein provide wireless communication to be carried out between the battery monitor and the communication device, while both the battery monitor and the communication device are mounted, installed on, or otherwise coupled to the same industrial vehicle.

Wireless communication requires creating a unique communication link between the battery monitor and the communication device on the same industrial vehicle. The wireless communication may be carried out by a process referred to herein as "pairing". Essentially, one device, e.g., the battery monitor, wirelessly broadcasts its existence, and the other device, e.g., the communication device on the industrial vehicle detects the battery monitor.

The battery monitor typically remains attached to the corresponding industrial battery. Moreover, industrial batteries are often moved between industrial vehicles. To compound the issues, it is often the case that numerous industrial vehicles may be in close proximity to one another. As such, a communication device on a first industrial vehicle may see numerous battery monitors broadcasting their existence. As such, aspects of the present disclosure herein, provides systems, methods and computer program products that allow a battery monitor attached to an industrial vehicle battery (which is installed in a given industrial vehicle), to uniquely and positively pair with the communication device also attached to the same industrial vehicle, in a fully automated way, without the need for manual intervention.

Accordingly, aspects of the present disclosure provide for the wireless pairing of the battery monitor to the communication device so that the communication device can receive battery usage information wirelessly from the battery monitor. The unique pairing between the battery monitor and the communication device is carried out without operator intervention or other operator-required inputs, making the collection of battery usage information automated.

System Architecture

Aspects of the present disclosure comprise systems that enable industrial vehicles to wirelessly communicate with applications deployed in an enterprise computing environment. As used herein, an industrial vehicle is any equipment that is capable of moving or otherwise being moved about a work site. Exemplary industrial vehicles include materials handling vehicles, such as forklift trucks, reach trucks, turret trucks, walkie stacker trucks, tow tractors, hand operated pallet trucks, etc.

Referring now to the drawings and particularly to FIG. 1, an exemplary computing environment 10 is illustrated, which includes components that support wireless communication capabilities. A plurality of industrial vehicles 12, such as materials handling vehicles (shown as forklift trucks for convenience of illustration), each include a communications device that enables that industrial vehicle 12 to wirelessly communicate with a remote processing device, such as an industrial vehicle application server 14. The industrial vehicle application server 14 may further interact with a data resource 16, e.g., one or more databases, data stores or other sources of information, to facilitate interaction with the industrial vehicles 12 as will be described in greater detail herein.

The computing environment 10 may further support additional processing devices 18, which may comprise for example, servers, personal computers, etc. One or more of the processing devices 18 may also communicate with the industrial vehicles 12 and/or the industrial vehicle application server 14 across the computing environment 10.

The wireless communication architecture may be based upon a standard wireless fidelity (WiFi) infrastructure, such as may be deployed using standard 802.11.xx wireless networks for a communications protocol. However, any other suitable protocol may alternatively be implemented. In an exemplary WiFi implementation, one or more wireless access points 20 may be utilized to relay data between a wireless transceiver of each industrial vehicle 12 and one or more wired devices of the computing environment 10, e.g., the industrial vehicle application server 14.

Moreover, the computing environment 10 may be supported by one or more hubs 22 and/or other networking components that interconnect the various hardware and/or software processing devices, including for example, routers, firewalls, network interfaces and corresponding interconnections. The particular networking components provided in the computing environment 10 may thus be selected to support one or more intranets, extranets, local area networks (LAN), wide area networks (WAN), wireless networks (WiFi), the Internet, including the world wide web, and/or other arrangements for enabling communication across the computing environment 10, either real time or otherwise, e.g., via time shifting, batch processing, etc.

In this regard, the computing environment 10 may make up part of a larger computing enterprise. A computing enterprise may link computer processing devices across one or more locations, where the processing devices are under the control, ownership or supervision of a common entity. For instance, a warehouse may have two or more physical buildings organized such that each building forms a computing environment 10, and the two computing environments 10 can be linked so to form a computing enterprise.

Also, one or more computing devices may further communicate with a remote server 30 across a network 32 such as the Internet. The remote server 30 may comprise, for example, a third party server (e.g., operated by the industrial vehicle manufacturer) that interacts with the industrial vehicles 12, the industrial vehicle application server 14, processing devices 18 of the computing environment(s) 10, processing devices of the computing enterprise(s), or combinations thereof. The remote server 30 may further interact with a data resource 34, e.g., one or more databases, data stores or other sources of information.

Industrial Vehicle Data Collection

Figure 2:
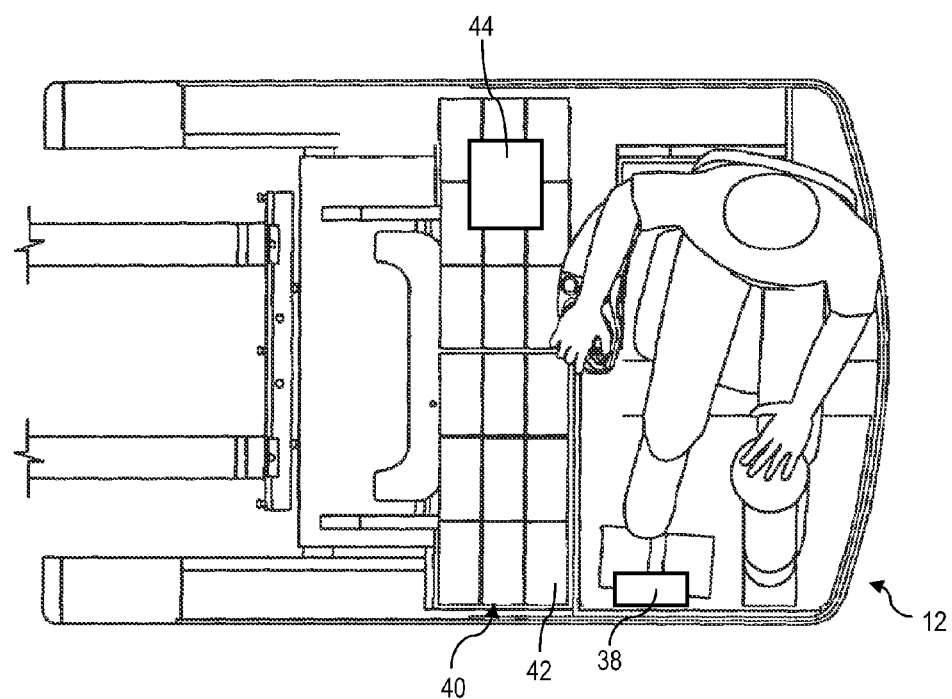
FIG. 2 is a view of an industrial vehicle having a battery that powers the industrial vehicle, a battery monitor that monitors the battery, and a communication device that functions as a communication device for wirelessly communicating with a computing environment, according to aspects of the present disclosure.

Referring to FIG. 2, an industrial vehicle 12 includes a communication device 38 (also referred to herein as an information linking device), an industrial vehicle battery 40 comprised of a plurality of battery cells 42 and a battery monitor 44 that monitors battery usage. The communication device 38 is utilized as part of a comprehensive vehicle management system that works in cooperation with one or more servers, e.g., as described above with reference to FIG. 1. Similarly, the battery monitor 44 is utilized as part of a comprehensive battery management system that also works in cooperation with one or more servers, e.g., as described above with reference to FIG. 1.

The communication device 38 and other aspects of the industrial vehicle 12 and corresponding computer environment described with reference to FIGS. 1 and 2 can incorporate any of the features and structures as set out in U.S. Pat. No. 8,060,400 to Wellman, entitled "Fleet Management System", the disclosure of which is incorporated by reference in its entirety.

Communication Device

Figure 3A:
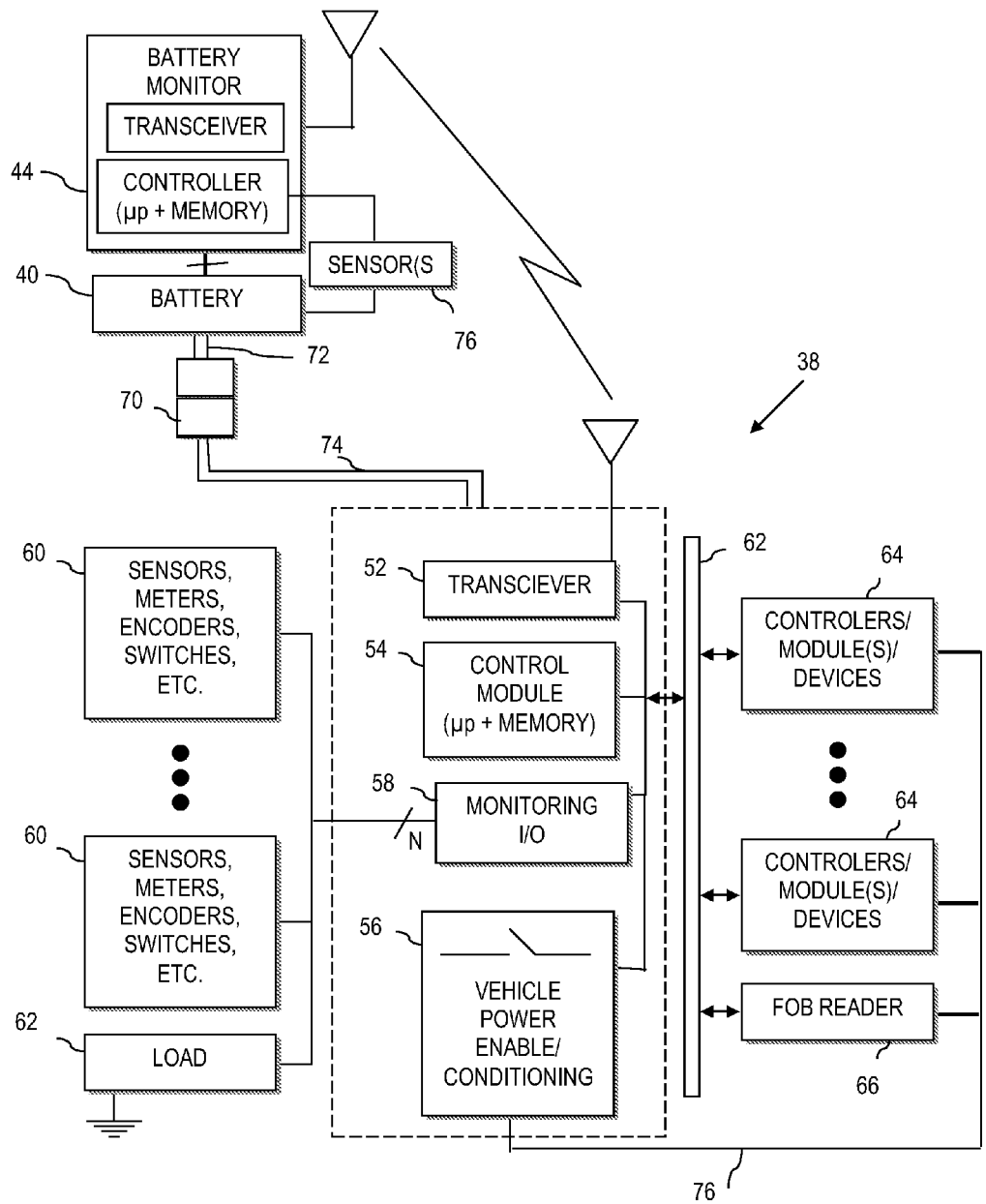
FIG. 3A is a block diagram of some of the features and the relationships between the battery monitor and the communication device of FIG. 2.

Referring to FIG. 3A, according to aspects of the present disclosure, the communication device 38 may be implemented as an information linking device provided on an industrial vehicle. The illustrative communication device 38 comprises the necessary circuitry to implement wireless communication, data and information processing, and wired communication to components of the industrial vehicle. As a few illustrative examples, the communication device 38 has a transceiver 52 for wireless communication. Although a single transceiver 52 is illustrated for convenience, in practice, one or more wireless communication technologies may be provided. For instance, the communication device 38 may be able to communicate with a remote server, e.g., server 14 of FIG. 1, via an 802.11.xx across the access points 20 of FIG. 1. The transceiver 52 may also optionally support other wireless communication, such as cellular, Bluetooth, infrared (IR) or any other technology or combination of technologies.

The communication device 38 also comprises a control module 54, having a processor coupled to memory for implementing computer instructions, including the relevant methods (or aspects thereof) as set out and described more fully herein. Still further, the control module can implement processes such as operator log on, pre-use inspection checklists, data monitoring and other features, examples of which are described more fully in U.S. Pat. No. 8,060,400 to Wellman, already incorporated by reference herein.

The communication device 38 further includes vehicle power enabling circuitry 56 to disable the industrial vehicle, partially enable the industrial vehicle for operation, or fully enable the industrial vehicle for operation. Still further, the communication device 38 includes a monitoring input output (I/O) module 58 to communicate via wired connection to devices mounted to or otherwise on the industrial vehicle, such as sensors, meters, encoders, switches, etc. (collectively represented by reference numeral 60). The communication device 38 is also connected to a component such as a load 62, as will be described in greater detail herein.

The communication device 38 is coupled to and/or communicates with other industrial vehicle system components via a suitable industrial vehicle network system 62, e.g., a vehicle network bus. The industrial vehicle network system 62 is any wired or wireless network, bus or other communications capability that allows electronic components of the industrial vehicle 12 to communicate with each other. As an example, the industrial vehicle network system may comprise a controller area network (CAN) bus, ZigBee, Bluetooth, Local Interconnect Network (LIN), time-triggered data-bus protocol (TTP) or other suitable communication strategy. As will be described more fully herein, utilization of the industrial vehicle network system enables seamless integration of the components of the industrial vehicle communication device 38 into the native electronics including controllers of the industrial vehicle 12 and optionally, any electronics peripherals associated with the industrial vehicle 12 that integrate with and can communicate over the network system. For instance, as illustrated, the communication device 38 connects with, understands and is capable of communication with native vehicle components, such as controllers, modules, devices, bus enabled sensors, etc. (collectively referred to by reference 64).

The communication device 38 can also communicate with a FOB 66 (or keypad, card reader or any other device for receiving operator log in identification. Still further, the communication device 38 can include a display and/or other features (not shown) to provide desired processing capability.

According to various aspects of the present disclosure, when a battery 40 is installed in the industrial vehicle 12, a plug 70 is used to connect a battery cable 72 to a vehicle power cable 74. In an illustrative implementation, when the battery cable 72 is plugged into the vehicle power cable 74 via the plug 70, the communication device 38 is powered up. The processor in the control module 54 boots up and the communication device 38 can begin to perform desired processing, independent of the industrial vehicle being started or otherwise energized for normal operation. For instance, as illustrated, the communication device 38 can use the vehicle power enabling circuitry 56 to selectively enable power to one or more vehicle components, e.g., based upon authenticated operator login or other logic.

Battery Monitor

The battery monitor 44 communicates with the communication device 38, the information server 14 or both. More particularly, the battery monitor 44 communicates with the communication device 38 using wireless technology, e.g., Bluetooth. The battery monitor 44 is (optionally permanently and physically) attached to the battery 40 and includes a processor, memory coupled to the processor, a transceiver, and other electrical structures to implement battery monitoring. Particularly, the battery monitor 44 samples characteristics of the battery 40 measured by the included sensors 76. Characteristics of the battery may comprise current (drawn from the battery or supplied to the battery during use, such as in regenerative braking, etc.), voltage, resistance, power, temperature (ambient or within the battery), fluid level, impedance, resistance, dynamic/transient loading, battery chemistry or any other measurable parameter of interest in monitoring of a battery, e.g., while connected to an industrial vehicle.

For instance, the illustrated battery monitor 44 interfaces with various sensors 76, such as a current sensor, one or more temperature sensors, a water level sensor, voltage sensor, impedance sensor, etc. The results can be stored in the memory of the battery monitor 44 itself, or the samples can be communicated to the communication device 38 for processing or storage. The communication device 38 can subsequently forward any information received from the battery monitor 44 to the information server 14, etc. Moreover, the communication device 38 can send summarized, compressed, or otherwise manipulated battery information to a remote server, e.g., server 14 in FIG. 1.

As used in the specification and claims, a "battery monitor" includes a monitor that monitors parameters, operating conditions, etc., of an energy storage device that is used to deliver power to a load such as an industrial vehicle. In many practical applications, the energy storage device is a battery. However, the energy storage device may alternatively comprise a fuel cell or other suitable device, such as a battery in combination with a supercap, etc.

Battery Charger

Figure 3B:
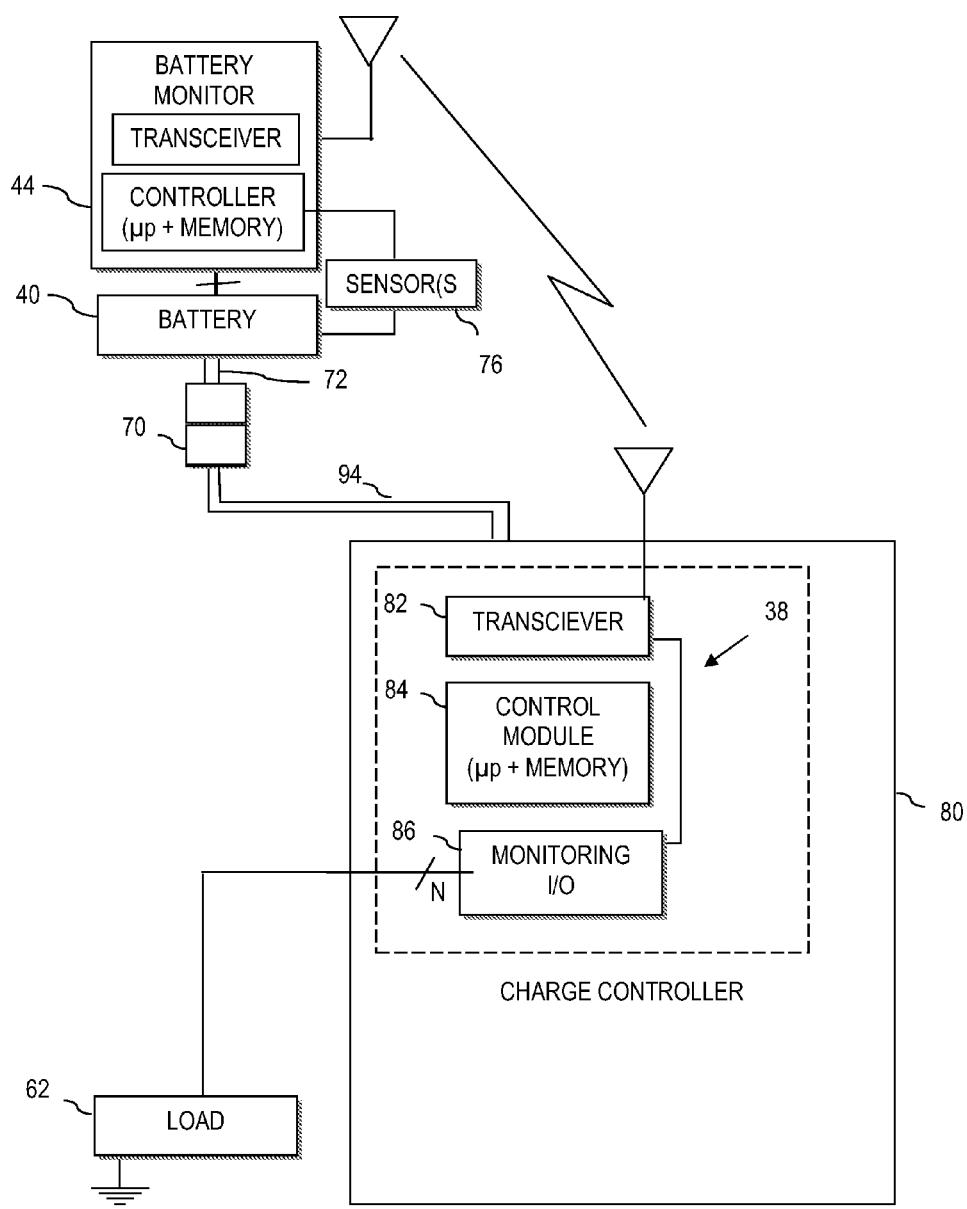
FIG. 3B is a block diagram of some of the features and the relationships between the battery monitor and a communication device provided on a battery recharger.

Referring to FIG. 3B, the communication device 38 may also be provided on, or otherwise associated with a device such as a battery charger 80. In a manner analogous to that described above with reference to FIG. 3A, the communication device 38 of the battery charger 80 comprises a transceiver 82 for wireless communication. For instance, the communication device 38 may be able to communicate with a remote server, e.g., server 14 of FIG. 1, via an 802.11.xx across the access the network of FIG. 1. The transceiver 82 may also optionally support other wireless communication, such as cellular, Bluetooth, infrared (IR) or any other technology or combination of technologies.

The communication device 38 also comprises a control module 84, having a processor coupled to memory for implementing computer instructions, including the relevant methods (or aspects thereof) as set out and described more fully herein. For instance, the control module 84 can be used to facilitate pairing with a corresponding battery monitor 44, using techniques as set out in greater detail herein.

Still further, the communication device 38 includes a monitoring input output (I/O) module 86 to communicate via wired connection to a component such as a load 62. In this manner, the load 62 is analogous to that described with reference to FIG. 3A. The communication device 38 further includes battery charging circuitry to recharge a battery coupled to the battery charger 80.

According to various aspects of the present disclosure, when a battery 40 is connected to the battery recharger 80, a plug 70 is used to connect the battery cable 72 to the battery charger power cable 94.

The battery monitor 44 communicates with the communication device 38, the information server 14 or both. More particularly, the battery monitor 44 communicates with the communication device 38 using wireless technology, e.g., Bluetooth. This allows, for instance, the battery monitor 44 to communicate battery charging parameters to the battery charger 80. Also, the battery charger 80 can communicate data to the battery monitor 44, e.g., data regarding charging operations, etc. In this regard, the battery monitor 44 can pair with a battery charger 80 during battery charging operations. Details about the charging operation can be transferred to the battery monitor 44, or the battery charger 80 can communicate the details of the charge event directly to a server, e.g., where the battery charger is communicatively coupled to a server via a network. Where the battery charger 80 communicates information to the battery monitor 44, the battery monitor 44 can subsequently forward that collected information to the communication device 38 on an industrial vehicle 12 when the corresponding battery is disconnected from the battery charger 80 and is reconnected to a corresponding industrial vehicle. As such, information can be automatically passed between the battery charger 80, the battery monitor 44 and the communication device 38 on a corresponding industrial vehicle 12 to which the corresponding battery is installed. Any of the above devices can further forward such collected information to a server, e.g., server computer 14 of FIG. 1.

Pairing the Battery Monitor to the Communication Device

Figure 4:
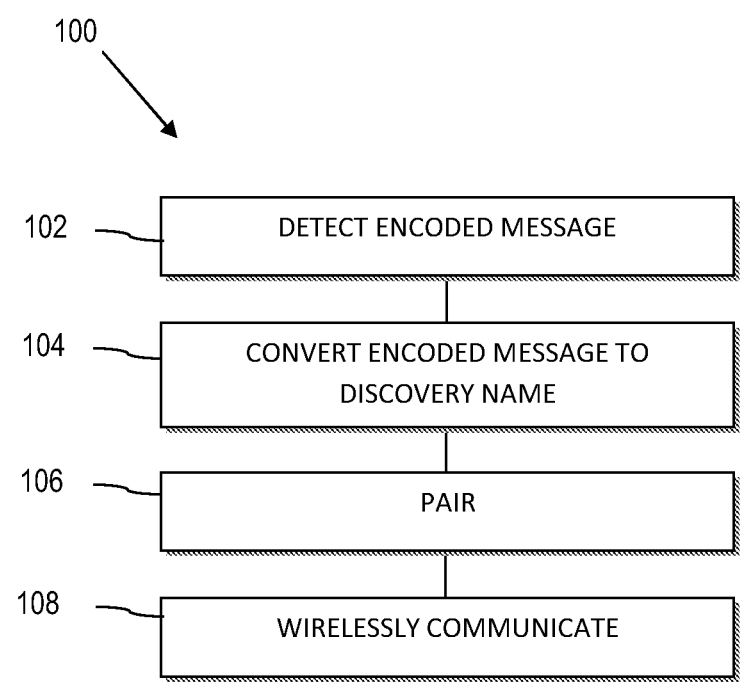
FIG. 4 is a flow chart of a method for pairing the battery monitor to the communication device, according to aspects of the present disclosure.

Referring to FIG. 4, a method 100 is provided, for uniquely pairing a battery monitor to a communication device, e.g., on an industrial vehicle having a battery (e.g., pairing the battery monitor 44 to the communication device 38, e.g., on the industrial vehicle 12 of FIGS. 1, 2, 3A) or a communication device 38 on a battery charger (e.g., battery charger 80 of FIG. 3B). The method 100 comprises detecting, by the battery monitor, an encoded message at 102. The encoded message is detected by sensing changes in a characteristic of the battery that occur responsive to the communication device transmitting the encoded message to a component.

Consider the example of FIG. 3A where the communication device 38 is provided with an industrial vehicle 12. As illustrated in FIG. 3A, the battery monitor 44 includes a sensor 76 to monitor the battery 40, such as a current sensor that allows the battery monitor 44 to sense the current flowing into or out of the battery 40. Also, the communication device 38 may transmit the encoded message to a component (by way of example, load 62 in FIG. 3A) on the industrial vehicle 12. In this regard, the load can be any device that causes current to flow to or from the battery. In the exemplary implementation, as best seen in FIG. 3A, the communication device 38 is wired to the load 62. In the above exemplary implementation, the component, e.g., load 62, is external to, independent from and otherwise unrelated to the battery monitor 44. That is, the load does not form an integral component of the battery monitoring system.

Notably, the industrial vehicle battery 40 provides the current drawn by components of the industrial vehicle during use of the vehicle. Accordingly, the communication device will draw power from the battery to communicate the encoded message across the load 62. For instance, as the battery 40 provides current to the communication device 38 to communicate the encoded message to the load 62, the sensor 76, e.g., a current sensing donut, shunt, etc. of the battery monitor 44, detects the current draw on the battery. The processor of the battery monitor 44 reads the encoded message from the detected fluctuations in current draw corresponding to/responsive to the encoded message. That is, the battery monitor 44 detects the changes in current from the battery 40 as power is drawn from the battery 40 to drive the load 62 responsive to the encoded message. As such, the battery monitor 44 can detect the encoded message itself.

The method also comprises converting at 104, the encoded message into a discovery parameter. For instance, the battery monitor 44 may detect spikes in the battery current drawn from the battery, where the spikes occur in a pattern corresponding to the value of the encoded message being driven. Data from the detected spikes may be loaded into an array or other structure so as to be converted (e.g., by using hexadecimal conversion) into a discovery parameter.

There are a number of ways to implement the discovery parameter. For instance, the discovery parameter may comprise a discovery name that is broadcast as part of the pairing operation. As another example, the discovery parameter may comprise a substitute MAC address. For instance, in Bluetooth pairing, a device in discoverable mode may broadcast both the discovery name and a MAC address. As such, the communication device 38 may encode a substitute MAC address that the battery monitor 44 can use to replace the MAC address that is broadcast as part of the pairing operation. As still a further example, the discovery parameter may comprise a security code such as a passkey. The passkey is an optional verification that is performed at the time of pairing. According to still further aspects of the present disclosure, the encoded message may encode more than one aspect into the discovery parameter. For example, the encoded message may include a discovery name, a substitute MAC address, a passkey, other attribute, or any combination thereof.

The method still further comprises setting up at 106, a paired wireless connection between the communication device on the industrial vehicle and the battery monitor using the discovery parameter. Examples of pairing are further described below with reference to FIGS. 5 and 6.

The method still further comprises using at 108, the paired wireless connection thereafter, to wirelessly communicate information between the battery monitor and the communication device.

In illustrative implementations, an event is utilized to set the communication device 38 and the battery monitor 44 into a "discovery mode" which causes the communication device 38 and the battery monitor 44 to pair. For instance, the method 100 may further comprise detecting, by the battery monitor, a triggering event. The triggering event is any event that causes the battery monitor and communication device to attempt to pair. The triggering event may be caused by conditions such as the communication device booting up and wanting to pair with the battery monitor, detecting a connection of the battery to the industrial vehicle, loss of the wireless connection, a predetermined time interval, etc. In an illustrative implementation, upon detecting the triggering event, the battery monitor begins, e.g., waits, polls for or otherwise listens for, the encoded message.

As a non-limiting illustration of a triggering event, prior to communicating the encoded message at 102, the method may comprise detecting that a power cable has been connected between a battery and the industrial vehicle. For instance, a battery 40 may be removed from an industrial vehicle 12 for a number of reasons, e.g., to recharge, repurpose to a different vehicle, etc. When the battery 40 is installed/re-installed on the industrial vehicle 12, the power is typically connected by plugging the battery 40 into a power cable, harness, connector or other configuration, e.g., as schematically represented by connector 70 and cables 72, 74.

When power is provided/restored to the industrial vehicle 12, the communication device 38 will boot up. Moreover, the battery monitor 44 will be already booted up and operational since it is provided on the battery 40 and can draw power from the battery regardless of whether the battery is installed in an industrial vehicle. As such, despite the fact that the industrial vehicle itself has not been started up, both the battery monitor 44 and the communication device 38 are fully operational. As such, the booting up of the communication device 38 could trigger an attempt to pair a wireless connection between the battery monitor 44 and the communication device 38.

This approach may be advantageous in that the industrial vehicle 12 is not likely started up for normal operation. As such, it may be the case that only the communication device 38 and the battery monitor 44 are drawing power from the industrial vehicle battery 40, thus making detection of the encoded message more reliable. For instance, the amount of noise in the battery system will be minimal. Of course, the communication of the encoded message may occur at other times, including times when the industrial vehicle is operational and/or being operated.

In order for the battery monitor 44 to pair with the communication device 38, the encoded message is converted into a discovery parameter. This may comprise mapping the encoded message to a new value, performing a manipulation (e.g., binary to hex conversion), calculation, transformation or other data processing to the encoded message. Alternatively, the encoded message could be converted into the discovery parameter without any data manipulation. That is, the value of the encoded representation could be the discovery parameter itself. Moreover, as noted above, the encoded message may be mapped to a discovery name, substitute MAC address, passkey, or combinations thereof.

Figure 5:
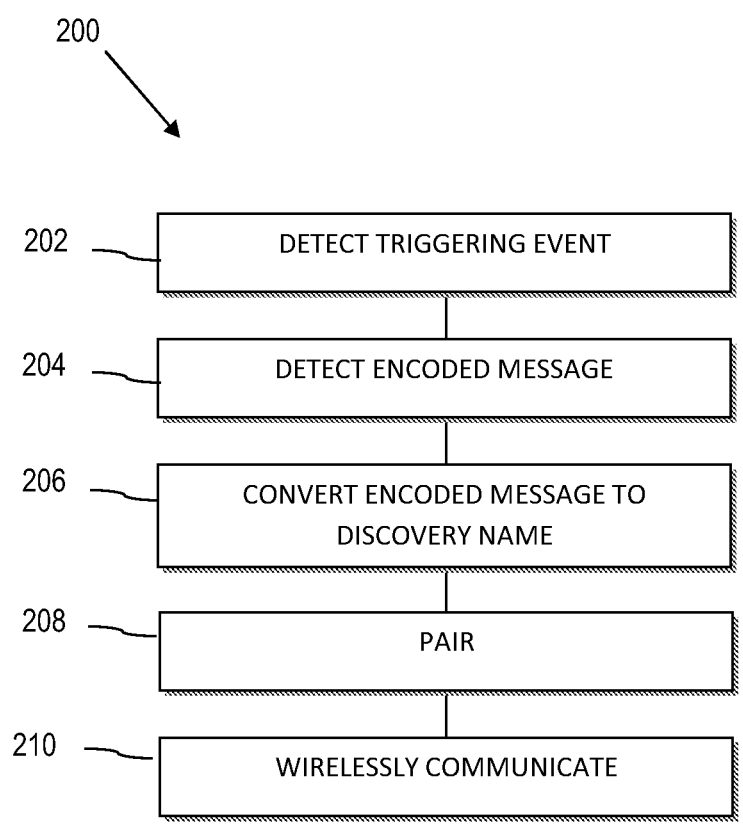
FIG. 5 is a flow chart of a method for pairing the battery monitor to the communication device from the perspective of the battery monitor, according to aspects of the present disclosure.
Figure 6:
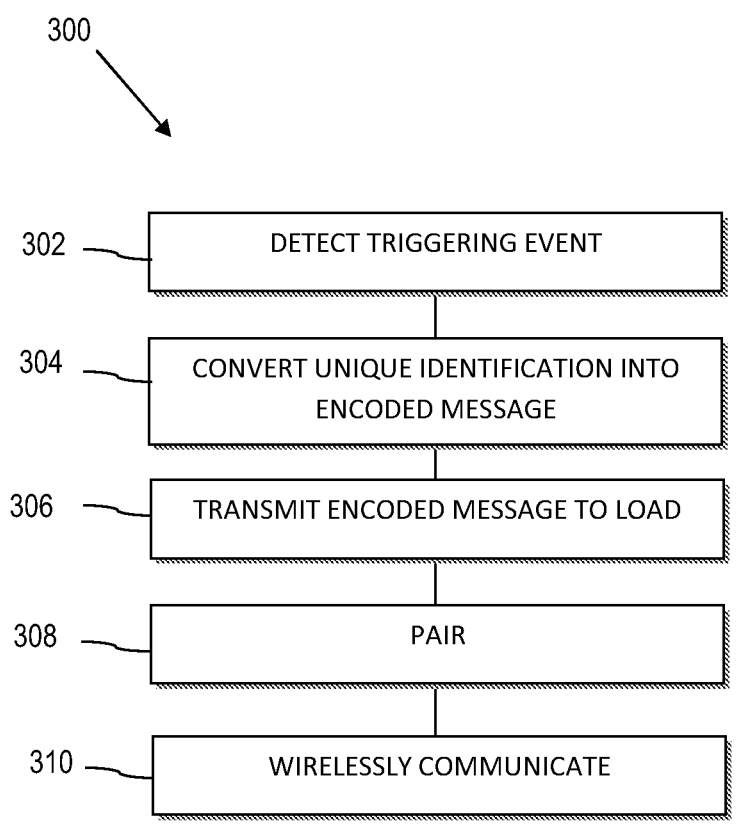
FIG. 6 is a flow chart of a method for pairing the battery monitor to the communication device from the perspective of the communication device, according to aspects of the present disclosure.

Additional details and examples of pairing the battery monitor 44 to the communication device 38 are described further below with regard to FIGS. 5 and 6, which described method of pairing the battery monitor 44 to the communication device 38 from the perspective of the battery monitor (FIG. 5) and from the communication device (FIG. 6).

Pairing Actions of the Battery Monitor

Referring to FIG. 5, a method 200 of pairing a battery monitor to a communication device on an industrial vehicle is illustrated. The method 200 is implemented from the perspective of the battery monitor. For instance, in an illustrative implementation, the actions of the method 200 are performed by the battery monitor 44, e.g., responsive to an attempt to pair with the communication device 30.

The method comprises optionally detecting at 202, a triggering event. While optional, the detection of a triggering event may be useful to define a period/time/interval in which pairing is attempted. In an exemplary implementation, the method may further comprise mounting the battery monitor physically on the battery and connecting a sensor of the battery monitor so as to monitor current communicated through the power cable. As noted in the example above, since the battery monitor is coupled to the battery, it is powered up as long as the battery has a charge. Also, when the battery is plugged into the industrial vehicle, the communication device may wake up. As such, as with the example described with reference to FIG. 4, the waking up of the communication device can serve as a trigger to make an attempt to pair the battery monitor to the communication device. That is, the battery monitor can begin to wait, listen for, poll for or otherwise attempt to identify the encoded message. Thus, the pairing can occur before the vehicle is started for normal operation. Alternatively, another trigger may be utilized.

The method 200 also comprises detecting at 204, an encoded message by sensing changes in a characteristic of the battery that occur responsive to the communication device transmitting the encoded message to a component of the industrial vehicle. For instance, as in the examples described above, the communication device 38 can transmit the encoded message to the load 62, which is external to the battery monitor 44.

The method further comprises converting at 206, the encoded message into a discovery parameter, and setting up at 208 a paired wireless connection with the communication device on the industrial vehicle using the discovery parameter. The method 200 still further comprises using at 210, the paired wireless connection thereafter, to wirelessly communicate information between the battery monitor and the communication device.

According to illustrative aspects of the present disclosure, the battery management module and the communication device communicate wirelessly using Bluetooth. In order for pairing in Bluetooth to take place, the Bluetooth pairing protocol must be followed. In an exemplary implementation, the discovery parameter is used to set up a paired wireless connection with the communication device on the industrial vehicle by implementing a discoverable mode. Here, the battery monitor wirelessly transmits the discovery parameter as a broadcast name. The communication device recognizes the discovery name that it placed into the encoded message and issues a pairing request. Thus the pairing request is from the communication device to the battery monitor.

Accordingly, the communication device indirectly feeds the Bluetooth device of the battery monitor at least one pairing parameter to broadcast, a passkey to verify against, or both. The communication device knows which parameter (s) it encoded into the encoded message, which was communicated the external load, and is thus able to negotiate pairing with the battery monitor 44.

As an example, assume that the discovery parameter is a discovery name. During Bluetooth pairing and discovery, instead of the battery monitor broadcasting a name programmed by the manufacture, the battery monitor broadcasts the unique name identified by the communication device. Since the communication device provided the name to the battery monitor, the communication device can pick out the correct Bluetooth device to pair with, even in situations where there are multiple candidates in the vicinity of the industrial vehicle that are identified during discovery.

As another example, during Bluetooth discoverable mode, a device attempting to pair may broadcast not only a discovery name, but also a MAC address. The communication device may have provided a substitute MAC address in the encoded message. Accordingly, the Bluetooth device replaces its normally broadcast MAC address with the substitute MAC address provided by the communication device. In this example, the communication device detects one or more Bluetooth devices in discoverable mode. The communication device builds a list of available Bluetooth devices, and then scans the discovery name and MAC address in the list to try to find a MAC address that matches the substitute MAC address that it communicated in the encoded message.

Thus, the battery monitor substitutes its MAC address with a substitute MAC address received from the communication device. Since the communication device knows the substitute MAC address, it can pick out the corresponding battery monitor despite multiple battery monitors broadcasting discovery requests in the vicinity of the communication device.

As still yet a further example, the communication device may encode a passkey in the encoded message. During an attempt to pair, the communication device may see one or more battery monitors attempting to pair. For instance, assume that the communication device 38 sees four battery monitors, broadcasting the discovery names BAT1, BAT2, BAT3 and BAT4, respectively. The communication device does not immediately know which battery monitor is installed on the battery that is powering the corresponding industrial vehicle. As such, the communication device picks BAT1 and attempts to pair. When BAT1 is selected, the communication device and the battery monitor that broadcast BAT1 exchange passkeys. If a security value of the communication device matches the passkey received by the battery module associated with the discovery name BAT1, then pairing is implemented. If a security value of the communication device does not match the passkey of the battery monitor, pairing is unsuccessful. As such, the communication device tries BAT2. The above process continues until the communication device finds a battery monitor that has a passkey that matches the security value of the communication device.

Yet further, a battery monitor may receive both a discovery name and a passkey, a substitute MAC address and a passkey, or both a discovery name and a substitute MAC address. In these instances, the communication device may be able to pick out the correct battery monitor based upon the broadcast information alone.

As an alternative to the above, and keeping with the example that the discovery parameter corresponds to discovery name, the communication device can broadcast its name for pairing. In this exemplary configuration, it is the communication device (not the battery monitor) that broadcasts a discovery name. Thus, the discoverable mode is implemented by the battery monitor searching names that are wirelessly broadcast for a match to the discovery parameter, which has been transmitted by the communication device on the industrial vehicle to the battery monitor. In this regard, the method may comprise issuing a pairing request from the battery monitor to the communication device. Thus, the pairing procedure works in either direction based upon the unique discovery parameter communicated by the communication device to the battery monitor. The difference lying in which device broadcasts and which device sends the pairing request.

Moreover, if the battery monitor and the communication device wirelessly pair using Bluetooth, other processes and procedures native to Bluetooth may be implemented. For instance, the battery monitor and the communication device can negotiate a passkey to authenticate the communication device to the battery monitor, etc.

The battery monitor can store information related to the pairing with the communication device. Moreover, pairing between the communication device and the battery monitor can persist until the battery cable is disconnected from the industrial vehicle independent of whether the industrial vehicle is powered on for normal operation.

Pairing Actions of the Communication Device

Referring to FIG. 6 a method 300 of pairing a battery monitor to a communication device on a materials handling vehicle is provided. The method 300 is implemented from the perspective of the communication device. For instance, in an illustrative implementation, the actions of the method 300 are performed by the communication device 30, e.g., responsive to an attempt to pair with the battery monitor 44.

Analogous to the method 200 of FIG. 5, the method 200 comprises optionally detecting at 302, a triggering event. While optional, the detection of a triggering event may be useful to define a period/time/interval in which pairing is attempted. For instance, the method 300 may detect that a power cable has been connected between a battery and the industrial vehicle.

The method may also comprise converting at 304, a unique identification into the encoded message. For instance, the communication device sends to the battery monitor, a message that identifies at least a discovery parameter that is also known to the communication device. To avoid confusion in pairing, the discovery parameter should be a unique identification known to the communication device. For instance, the discovery parameter should be unique, at least to the broadcast area within which the industrial vehicle (and hence, the communication device 38 and the battery monitor 44) operate. An exemplary way of generating a unique discovery parameter is for the communication device to convert its MAC address to the encoded message. So as not to be confused with the example above with reference to FIG. 5, the MAC address of the communication device may serve as a unique discovery name, as a substitute MAC address of the battery monitor for purposes of discoverable mode broadcasting by the battery monitor, or both. The unique identifier may be associated with the discovery name, substitute MAC address, passkey (e.g., a security code) or combinations thereof.

As a few other examples, the communication device may obtain the unique identification from a remote server computer, or otherwise acquire the unique identifier. In this regard, the remote server may serve the unique discovery parameters to an entire fleet of industrial vehicles with their corresponding communication device/battery monitor. By controlling all of the discovery parameters, the server can ensure that each discovery parameter is unique, despite an entire fleet of industrial vehicles being operated in close proximity.

The method 300 also comprises transmitting at 306, the encoded message to a component of the industrial vehicle that is external to the battery monitor, so as to be detected by the battery monitor sensing changes in a characteristic of the battery responsive to the encoded message, where the encoded message corresponds to a unique discovery parameter. For instance, as described in greater detail herein, the communication device can drive a load with the encoded message, as explained more fully herein.

The method further comprises setting up at 308, a paired wireless connection with the battery monitor on the industrial vehicle using the discovery parameter, where the pairing is based upon the encoded message communicated from the communication device to the component, and using at 310, the paired wireless connection thereafter, to wirelessly communicate information between the battery monitor and the communication device.

For instance, as described in greater detail above, illustrative implementations may comprise booting up the communication device in response to power being connected to the industrial vehicle by the battery, and transmitting the encoded message before the industrial vehicle is powered up for normal operation.

Moreover, as noted above with reference to FIG. 5, where Bluetooth is utilized, a paired wireless connection can be set up with the battery monitor on the industrial vehicle using the discovery parameter. As an example, the communication device may implement a discoverable mode by wirelessly transmitting the discovery parameter as a broadcast name and receiving a pairing request from the battery monitor. Alternatively, the communication device may implement a discoverable mode by searching names that are wirelessly broadcast for a match to the known discovery parameter, which has been previously transmitted to the battery monitor. If the discovery parameter is located, the communication device issues a pairing request to the battery monitor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure.

Having thus described the disclosure of the present application in detail and by reference to embodiments thereof, it will be apparent that modifications and variations are possible without departing from the scope of the disclosure defined in the appended claims.

What is claimed is:

1. A monitoring system for industrial vehicles, comprising:
a storage device monitor that is powered by an energy storage device to which the storage device monitor is attached, the storage device monitor comprising:
a wireless transceiver;
a sensor capable of sensing an energy storage device characteristic; and
a controller coupled to the wireless transceiver and the sensor;
a communication device mounted to an industrial vehicle, the communication device and the industrial vehicle also powered by the energy storage device, the communication device comprising a wireless transceiver; and
a load that is electrically connected to the communication device, wherein the load is external to and independent from the storage device monitor;
wherein:
the communication device is programmed to transmit an encoded message to the load;
the controller of the storage device monitor is programmed to:
detect, using the sensor, the encoded message by sensing changes in the energy storage device characteristic that occur responsive to the communication device transmitting the encoded message to the load;
convert the encoded message into a discovery parameter; and
pair with the communication device across a wireless network based upon the discovery parameter; and
the communication device and the storage device monitor wirelessly communicate information between each other using the paired wireless connection.

2. The monitoring system of claim 1, wherein:
the discovery parameter includes a broadcast name; and
the controller of the storage device monitor is programmed to pair with the communication device by being programmed to:
broadcast, via the wireless transceiver of the storage device monitor, the broadcast name to the wireless transceiver of the communications device;
receive, in response to broadcasting the broadcast name, a pairing request from the wireless transceiver of the communications device; and
pair with the communication device.

3. The monitoring system of claim 1, wherein:
the discovery parameter includes a substitute media access control (MAC) address; and
the controller of the storage device monitor is programmed to pair with the communication device by being programmed to:
broadcast, via the wireless transceiver of the storage device monitor, the substitute MAC address to the wireless transceiver of the communications device;
receive, in response to broadcasting the substitute MAC address, a pairing request from the wireless transceiver of the communications device; and
pair with the communication device.

4. The monitoring system of claim 1, wherein:
the discovery parameter includes a passkey; and the controller of the storage device monitor is programmed to pair with the communication device by being programmed to:
broadcast, via the wireless storage device monitor transceiver, a discovery name to the communications device transceiver;
receive, in response to broadcasting the discovery name, a pairing request including a security value from the wireless communications device transceiver; and
pair with the communication device if the security value matches the passkey.

5. The monitoring system of claim 1, wherein the controller of the storage device monitor is further programmed to:
enter a discovery mode when detecting a triggering event; and
listen for the encoded message until the encoded message is detected.

6. The monitoring system of claim 1, wherein the energy storage device is a battery.

7. The monitoring system of claim 1, wherein the energy storage device is a fuel cell.

8. The monitoring system of claim 1, wherein the controller of the storage device monitor is programmed to convert the encoded message into a discovery parameter by being programmed to process the encoded message to generate the discovery parameter.

9. The monitoring system of claim 1, wherein the controller of the storage device monitor is programmed to convert the encoded message into a discovery parameter by being programmed to use the encoded message as the discovery parameter without any data manipulation.

10. The monitoring system of claim 1, wherein:
the sensor is a current sensor coupled to the energy storage device; and
the controller of the storage device monitor is programmed to detect the encoded message by being programmed to detect current drawn by the energy storage device responsive to the communication device transmitting the encoded message to the load.

11. The monitoring system of claim 1, wherein the sensor is select one of:
a voltage sensor;
a resistance sensor;
an impedance sensor;
a power sensor;
a temperature sensor;
a fluid-level sensor; and
a chemical sensor.

12. The monitoring system of claim 1, wherein:
the communication device further includes power enabling circuitry; and
the controller of the storage device monitor is programmed to pair with the communication device by being programmed to pair with the communication device before the power enabling circuitry enables the industrial vehicle for normal operation.

13. The monitoring system of claim 1, wherein:
the wireless transceiver of the storage device monitor is a Bluetooth wireless transceiver; and
the wireless transceiver of the communication device is a Bluetooth wireless transceiver.

14. A monitoring system comprising:
a storage device monitor that is powered by an energy storage device to which the storage device monitor is attached, the storage device monitor comprising:
a wireless transceiver;
a sensor capable of sensing an energy storage device characteristic; and
a controller coupled to the wireless transceiver and the sensor;
a communication device mounted on a battery charger, the communication device comprising a wireless transceiver; and
a load that is electrically connected to the communication device, wherein the load is external to and independent from the storage device monitor;
wherein:
the communication device is programmed to transmit an encoded message to the load;
the controller of the storage device monitor is programmed to:
detect, using the sensor, the encoded message by sensing changes in the energy storage device characteristic that occur responsive to the communication device transmitting the encoded message to the load;
convert the encoded message into a discovery parameter; and
pair with the communication device across a wireless network based upon the discovery parameter.

15. The monitoring system of claim 14, wherein:
the discovery parameter includes a broadcast name; and
the controller of the storage device monitor is programmed to pair with the communication device by being programmed to:
broadcast, via the wireless transceiver of the storage device monitor, the broadcast name to the communications device transceiver;
receive, in response to broadcasting the broadcast name, a pairing request from the wireless transceiver of the communications device; and
pair with the communication device.

16. The monitoring system of claim 14, wherein:
the discovery parameter includes a substitute media access control (MAC) address; and
the controller of the storage device monitor is programmed to pair with the communication device by being programmed to:
broadcast, via the wireless transceiver of the storage device monitor, the substitute MAC address to the wireless transceiver of the communications device;
receive, in response to broadcasting the substitute MAC address, a pairing request from the wireless transceiver of the communications device; and
pair with the communication device.

17. The monitoring system of claim 14, wherein:
the discovery parameter includes a passkey; and
the controller of the storage device monitor is programmed to pair with the communication device by being programmed to:
broadcast, via the wireless transceiver of the storage device monitor, a discovery name to the communications device transceiver;
receive, in response to broadcasting the discovery name, a pairing request including a security value from the wireless transceiver of the communications device; and
pair with the communication device if the security value matches the passkey.

18. The monitoring system of claim 14, wherein the controller of the storage device monitor is programmed to convert the encoded message into a discovery parameter by being programmed to process the encoded message to generate the discovery parameter.

19. The monitoring system of claim 14, wherein the controller of the storage device monitor is programmed to convert the encoded message into a discovery parameter by being programmed to use the encoded message as the discovery parameter without any data manipulation.

20. The monitoring system of claim 14, wherein:
   the sensor is a current sensor coupled to the energy storage device; and
   the controller of the storage device monitor is programmed to detect the encoded message by being programmed to detect current drawn by the energy storage device responsive to the communication device transmitting the encoded message to the load.

* * * * *